March 25, 1924. 1,488,333
D. E. FORCE ET AL
EMERGENCY BRAKE
Filed Dec. 10, 1921
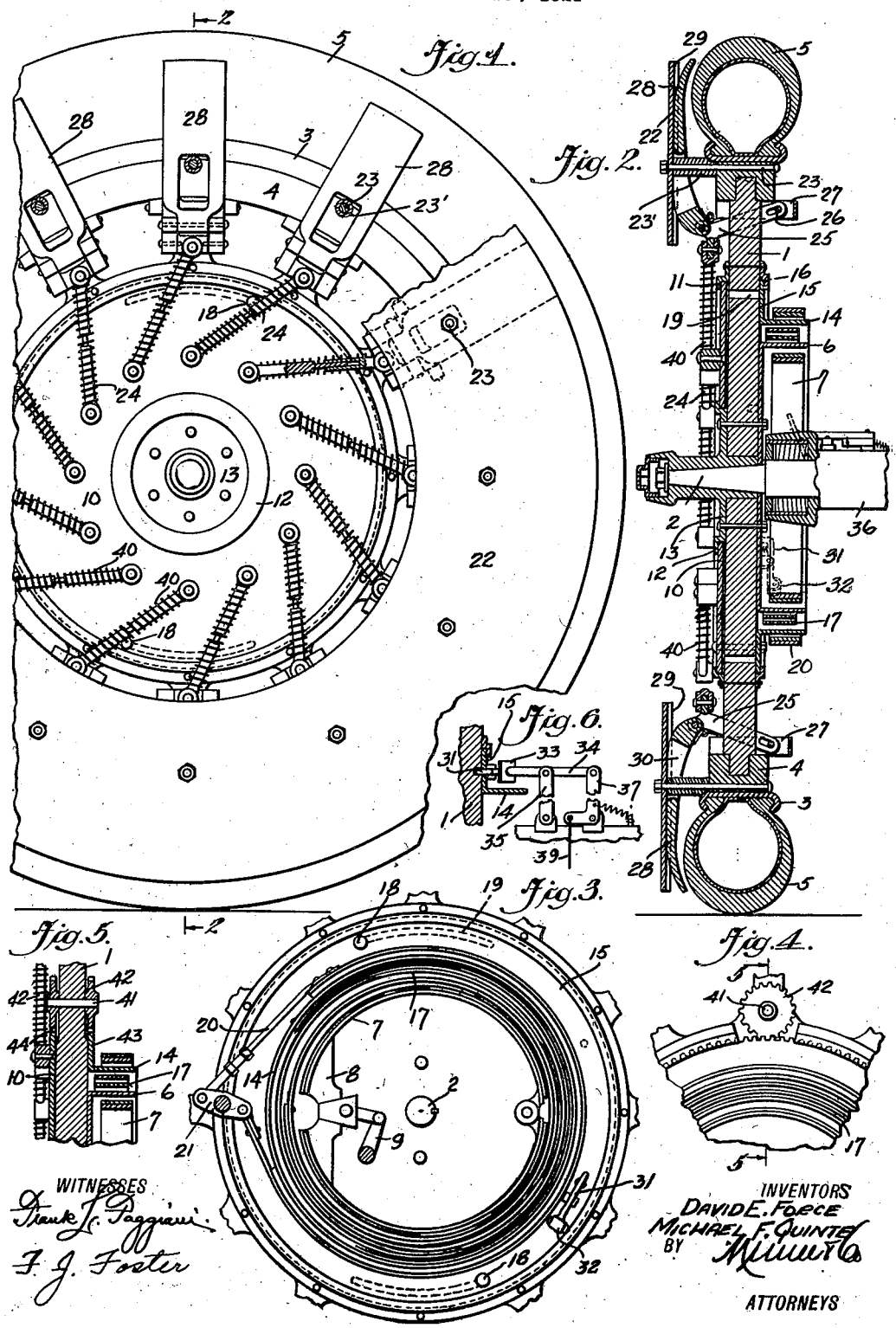

Patented Mar. 25, 1924.

1,488,333

UNITED STATES PATENT OFFICE.

DAVID E. FORCE, OF JERSEY CITY, NEW JERSEY, AND MICHAEL F. QUINTE, OF BURBANK, CALIFORNIA.

EMERGENCY BRAKE.

Application filed December 10, 1921. Serial No. 521,442.

*To all whom it may concern:*

Be it known that we, DAVID E. FORCE, a citizen of the United States, and a resident of Jersey City, in the county of Hudson and State of New Jersey, and MICHAEL F. QUINTE, a subject of the King of Italy, and a resident of Burbank, in the county of Los Angeles and State of California, have invented a new and Improved Emergency Brake, of which the following is a full, clear, and exact description.

This invention relates to improvements in emergency brakes for vehicles, an object of the invention being to provide a device of this character which can be operated independently of the ordinary service brake.

A further object is to provide an emergency brake equipped with a plurality of road engaging members which may be used as a non-skid device as well as a brake, which may be used to dig a vehicle out of mud holes, and which will permit a vehicle to be operated upon a deflated tire without injuring the tire.

A further object is to provide an emergency brake which will be practical in construction, durable and efficient in use, and which will not interfere with the changing of tires on a vehicle.

With these and other objects in view the invention consists in certain novel features of construction, and combination and arrangements of parts, as will be more fully hereinafter described and pointed out in the claims.

In the accompanying drawings—

Figure 1 is a fragmentary view in side elevation of a wheel with my improved emergency brake applied thereto, parts being broken away for clearness.

Fig. 2 is a view in transverse section on the line 2—2 of Fig. 1.

Fig. 3 is an inside view of the brake drums and their controlling mechanisms.

Figs. 4 and 5 are fragmentary detail views illustrating a slight modification.

Fig. 6 is a broken fragmentary detail view of the emergency brake rocking and releasing mechanism.

Referring in detail to the drawings, 1 represents a solid wheel mounted upon an axle 2; a conventional tire rim 3 supported upon the wheel felly 4 retains a pneumatic tire 5 in place.

A brake drum 6 secured to the inside of the wheel 1 contains a brake band 7 and a conventional operating mechanism such as the spreader 8 and lever 9 for moving the brake band into operative position against the drum.

A disk 10 is held in position against the outer face of the wheel by an annular channel strip 11 receiving the outer edge of the disk and an annular flange 12 on an extension 13 of the wheel hub which receives the inner edge of the disk. An auxiliary brake drum 14 for my improved emergency brake is made integral with an outwardly extending flange 15 secured to the inner face of the wheel 1 and retained in place by an annular guide strip 16. A flat coiled spring 17 is wound around the inner brake drum 6 and is operatively connected to the inside of the outer brake drum 14.

The disk 10 and the flange 15 are connected at diametrically opposed points by pins 18 which are movable in arcuate slots 19 in the wheel 1 to permit limited rotary movement of the disk 10 and the brake drum 14. A brake band 20 around the drum 14 is operated by a pivoted lever 21 in a conventional manner.

A flat metal ring 22 is secured to the outside of the wheel felly 4 by relatively long bolts 23. Spacing sleeves 23' around the bolts maintain the ring 22 in spaced relationship to the felly. The spacing sleeves 23' also serve to hold the wheel rim 3 in position. Telescoping levers 24 are pivoted at their inner ends to the disk 10, the pivoted ends of the levers being arranged in an annular series around the disk. The levers 24 are normally disposed in tangential relationship to the wheel hub and are pivotally connected at their outer ends to links 25 projecting through the wheel 1 adjacent the felly and having slot and pin connections such as 27 with brackets secured in an annular series to the inside of the wheel. The links 25 are in turn pivotally secured adjacent their point of connection to the levers 24 to ground engaging spurs in the form of plates 28. These plates are slidable radially in grooves 29 on the inner face of the ring 22 and are slotted as indicated at 30 to accommodate the spacing sleeves 23'.

A pivoted latch 31 is mounted on the flange 15 and is engageable in a pocket in the wheel 1 to lock the flange 15 against rotation. A roller 32 carried by the latch 31 extends inwardly from the flange. A cam member 33 is mounted upon the end of a link 34, the link itself being pivotally mounted upon a bracket 35 secured to the axle housing 36. The link 34 may be operated by a pivoted lever 37 to move the cam member 33 into engagement with the roller 32, tripping the latch 31 and releasing the brake drum 14 and the disk 10.

The operation of the device is as follows: It will readily be seen that the ordinary service brake associated with the brake drum 6 may be applied without effecting in any way the emergency brake. When, however, it becomes necessary to apply the emergency brake, tightening of the brake band 20 will cause the drum 14 and disk 10 to rotate until they are stopped by the engagement of the pins 18 in the ends of the slots 19. As the disk 10 rotates the levers 24 are moved to radial position, operating through the medium of the links 25 to propel the spurs 28 radially and into engagement with the road. The latch 31 drops into the opening in the flange 15 holding the levers 24 and spurs 28 in extended position. When it is desired to release the spurs a cable 39 attached to the lever 37 may be operated to move the cam 33 into contact with the roller 32, tripping the latch 31 and allowing the spring 17 to restore the various parts of the emergency brake to their normal position. The telescoping levers 24 may, if desired, be wrapped with coiled springs 40 to cushion the action of the emergency brake. If for any reason it becomes necessary to remove the tire and tire rim, the nuts are removed from bolts 23 and the spacing sleeves 23' taken off the bolts so as to release the tire. The spurs 28 are then rotated inward thus making it possible to draw the tire and tire rim from the wheel 4.

In Figs. 4 and 5 I have illustrated a slight modification wherein a different form of connecting means is employed between the brake drum 14 and the disk 10. Instead of using the pins 18 and slots 19 we provide a shaft 41 journaled in the wheel 1. Pinions 42 are mounted on the shaft at opposite sides of the wheel. A flange 43 corresponding to the flange 15 is formed with gear teeth around its edge meshing with one of the pinions and the disk 10 may also be provided with gear teeth 44 meshing with the other pinion so that movement of the flange 43 causes movement of the disk 10. The operation of the device is exactly the same as in the preferred form.

It will be apparent that instead of using the device for an emergency brake it might be used as a non-skid device or for the purpose of extricating a vehicle from a mud hole. In case of a punctured tire or a blowout of the driver of the car may safely run upon the spurs 28 without injuring the deflated tire or tube.

Although we have illustrated certain of the preferred embodiments of the invention it will be understood that various slight changes might be made in the general form and arrangement of the parts described without departing from the invention, and hence we do not limit ourselves to the precise details set forth but consider ourselves at liberty to make such changes and alterations as fairly fall within the spirit and scope of the appended claims.

We claim:

1. The combination with a vehicle wheel and a service brake including a drum and operating means within the drum, of an auxiliary brake drum located around the drum of the service brake and having limited rotary movement on the wheel, radially movable road engaging members, means whereby rotation of the auxiliary brake drum moves said members to road engaging position and locks them in said position, means for releasing the locking means, and a coiled spring interposed between the two brake drums for restoring the auxiliary brake drum to its normal position.

2. The combination with a vehicle wheel of a brake drum having limited rotary mounting on the wheel, a disk on the opposite side of the wheel coupled for simultaneous movement with the drum, cushioned levers pivoted on the disk, radially movable road engaging members, means guiding the radial movement and permitting lateral movement of said members, pivoted links associated with the wheel felly operatively connecting the levers and road engaging members, said levers normally disposed in tangential relationship to the wheel hub whereby rotation of the disk moves said levers to radial position and projects the road engaging members radially.

3. The combination with a wheel and a movable brake drum therefor; of a plurality of road engaging members movable radially with respect to said wheel, a latch for locking said members in operative position, means actuated by the movement of said drum for operating said latch, and means for tripping said latch to permit of restoration of said road engaging members to inoperative position.

4. The combination with a wheel and a movable brake drum therefor having a flange; of a plurality of road engaging members movable radially with respect to said wheel, means actuated by movement of said drum for moving said road engaging members to operative position, a latch actuated by the last named means to engage said flange to retain said road engaging members in operative position, and means for tripping said latch to permit of restoration of said road engaging members to inoperative position.

DAVID E. FORCE.
MICHAEL F. QUINTE.